Nov. 13, 1934.  W. J. BOYLE, JR., ET AL  1,980,164
DRUM WELDING MACHINE
Filed Jan. 18, 1932   6 Sheets-Sheet 5

Inventors.
Willis J. Boyle Jr. and
Leland B. Rosener
By George I. Haight. Attorney.

Patented Nov. 13, 1934

1,980,164

UNITED STATES PATENT OFFICE 1,980,164

DRUM WELDING MACHINE

Willis J. Boyle, Jr., Los Angeles, and Leland S. Rosener, San Francisco, Calif., assignors to The Boyle Manufacturing Company, Inc., Los Angeles, Calif., a corporation of California Application January 18, 1932, Serial No. 587,204

28 Claims. (Cl. 113—59)

This invention relates to improvements in drum welding machines.

The machine of the present invention is designed for the purpose of welding the edges of metal drums by the use of an acetylene or similar torch, which fuses the metal contiguous to the abutting edges of the cylindrical drum body as the latter is fed forward through the machine.

The invention is so designed as to feed forward a procession of drum bodies in close contact with one another, so that, as the procession moves forward, no gaps will be presented between successive drums which would permit the welding flame to lick down between the edges of adjacent drums and melt away the metal contiguous to the terminus of the joint.

The machine is designed to act upon metal sheets bent to cylindrical form, and flanged along the abutting edges, by the employment of feed rolls which grip the flanged edges on opposite sides of the joint, which method of gripping not only affords a positive grip for the power driven feed rollers, but also serves to compress the flanged edges closely together during the period of time that the joint is subjected to the action of the welding flame.

Provision is also made for permitting a succeeding drum body to be shoved forward at a speed in excess of the roller feeding speed, so that each successive drum body may be brought into closely abutting relation to the one preceding it, for the purpose of avoiding gaps in the procession, which would permit the welding flame to melt away the contiguous metal in the manner previously mentioned.

The structure of the machine is one which permits the drum to be slipped onto the rear end of the machine with the seam down and sufficiently distended to clear the rear support for the beam or stake, after which the drum is rotated to present the flanged edges upwardly in position to be gripped by the feeding rolls and fed forwardly through the arch which supports the feeding and welding mechanisms. Adequate provision is made for the easy manipulation of the drums within the machine, and for permitting the machine to be adjusted to drums of varying diameter.

The invention relates to the general structure of the machine as a whole; to the formation and arrangement of the feeding rolls; to the means provided for transmitting power to the feeding rolls, and for imparting spring pressure to one roll of each pair, and various other features which will be pointed out in fuller detail in the specification.

Figure 1:
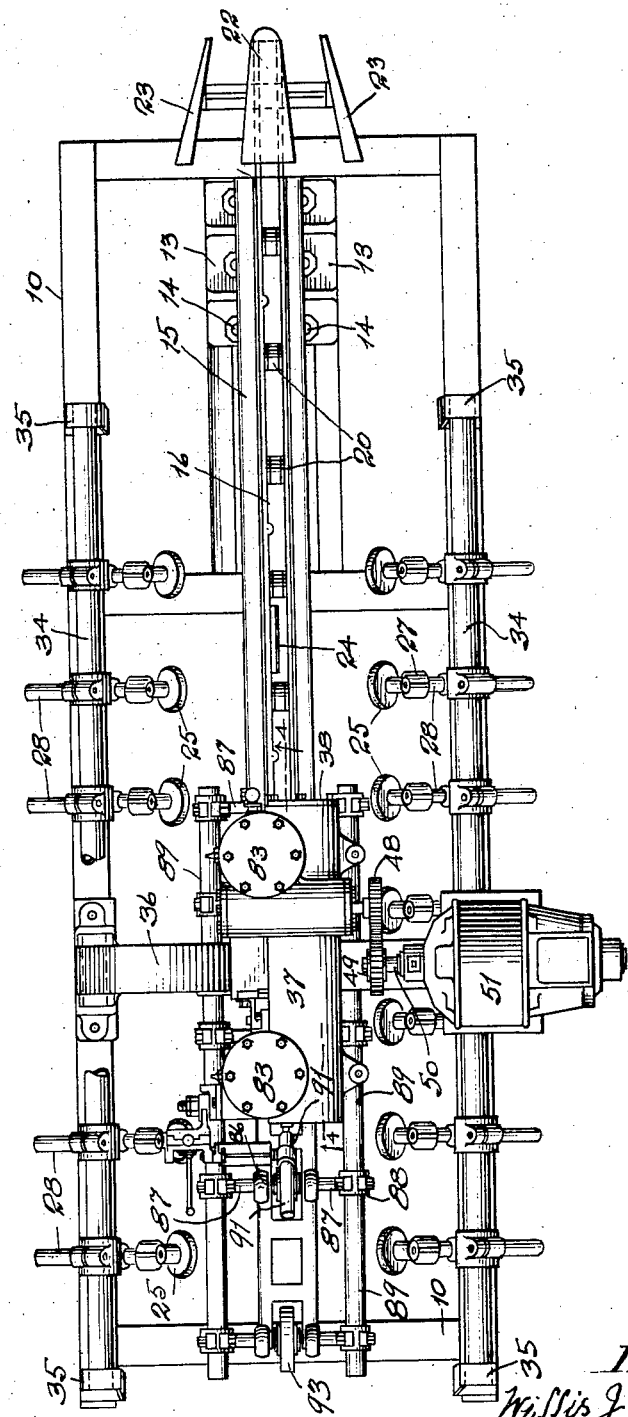
Figure 1 is a top plan view of the machine as a whole.
Figure 2:
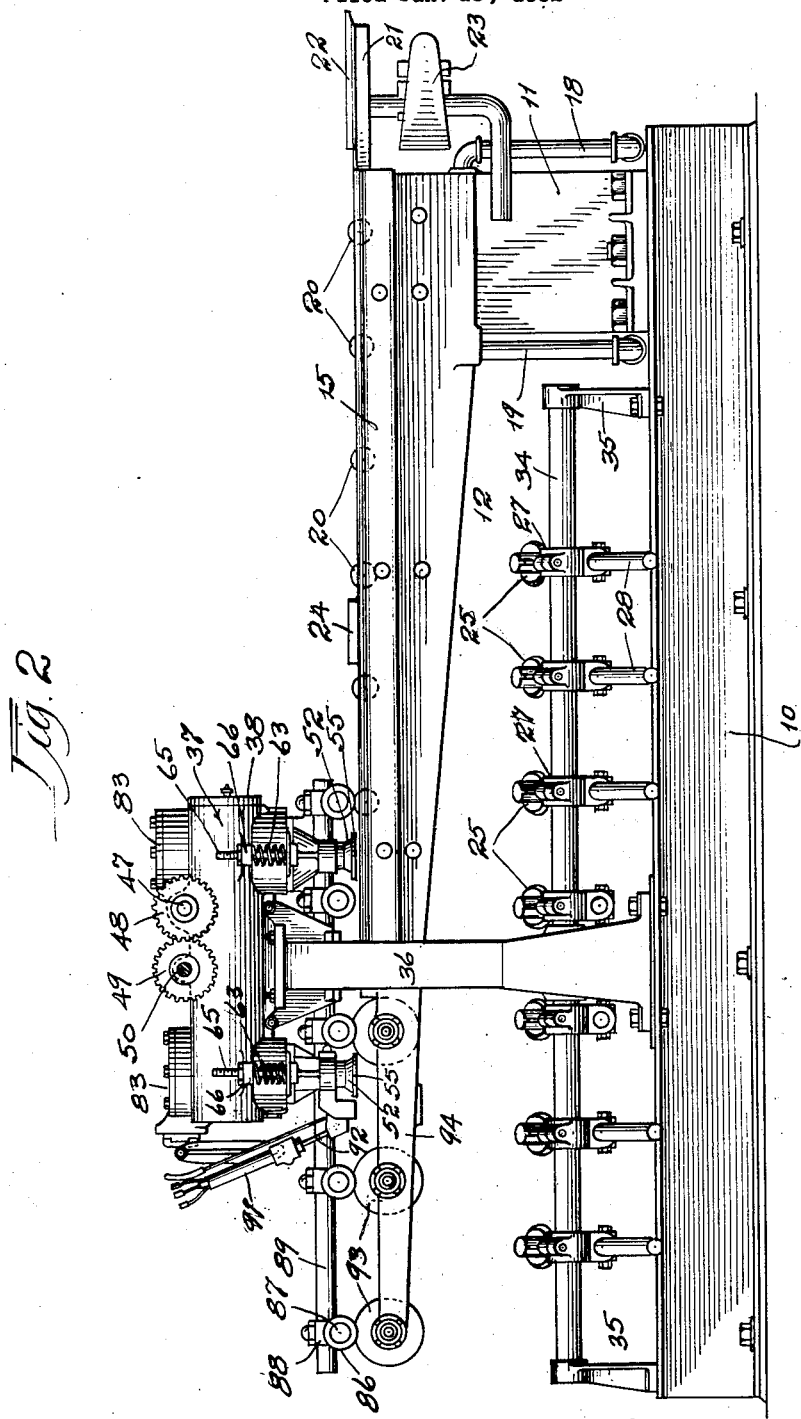
Fig. 2 is a side elevation of the same.

The machine as a whole is mounted upon an elongated rectangular base 10, at the rear end of which is secured an upstanding web plate 11 which carries a horizontal beam or stake 12, which latter as shown is of forwardly tapered formation, having a maximum vertical dimension at its rear end, which is supported upon the web plate 11. The forward end of the beam or stake is unsupported and the web is of sufficient length, fore and aft, to afford a firm and rigid support for the structure. As shown, the web plate 11 is provided with flanges 13—13 constituting a base, through which are entered bolts 14 which rigidly unite the web to the base 10.

The beam or stake, throughout the major portion of its extent, is configured to present its upper surface in the form of a rounded shoe 15 provided in its center with a longitudinally extending channel 16. The body of the stake, below the shoe, is of wedge shaped formation, and the entire interior of the stake is cored to afford an interior chamber 17, through which water may be circulated to prevent overheating of any portion of the stake in proximity to the welding flame of the torch. As shown, water circulation to and from the interior of the stake is afforded by supply and return pipes 18 and 19 leading to the cored interior of the stake at points closely adjacent to the supporting web plate 11. The channel 16 affords clearance for the journalling of a group of idle rolls 20 which stand in uniformly spaced relation to one another and serve to underlie the inner surface of the drum along the seam line.

In order to facilitate the positioning of the drums upon the machine, the rear end of the stake is provided with an extension 21 which carries an upper shoe 22 and a pair of lateral shoes 23—23, which latter, as shown in Fig. 1, converge rearwardly and in line to permit the unwelded drum to be positioned upon the rear of the machine with its flanged edges presented downwardly and spread sufficiently to straddle the web plate, which arrangement permits the drum thus positioned to be moved forwardly until the drum clears the web plate, after which its position is reversed to bring the flanged edges upwardly in preparation for the welding. The drum thus positioned is moved sufficiently to bring the contiguous edges to position on opposite sides of a thin separating blade 24, which serves to maintain the seam or joint in proper alignment with the longitudinal center of the machine, although the blade is not of sufficient thickness to space the edges to any appreciable extent.

Figure 3:
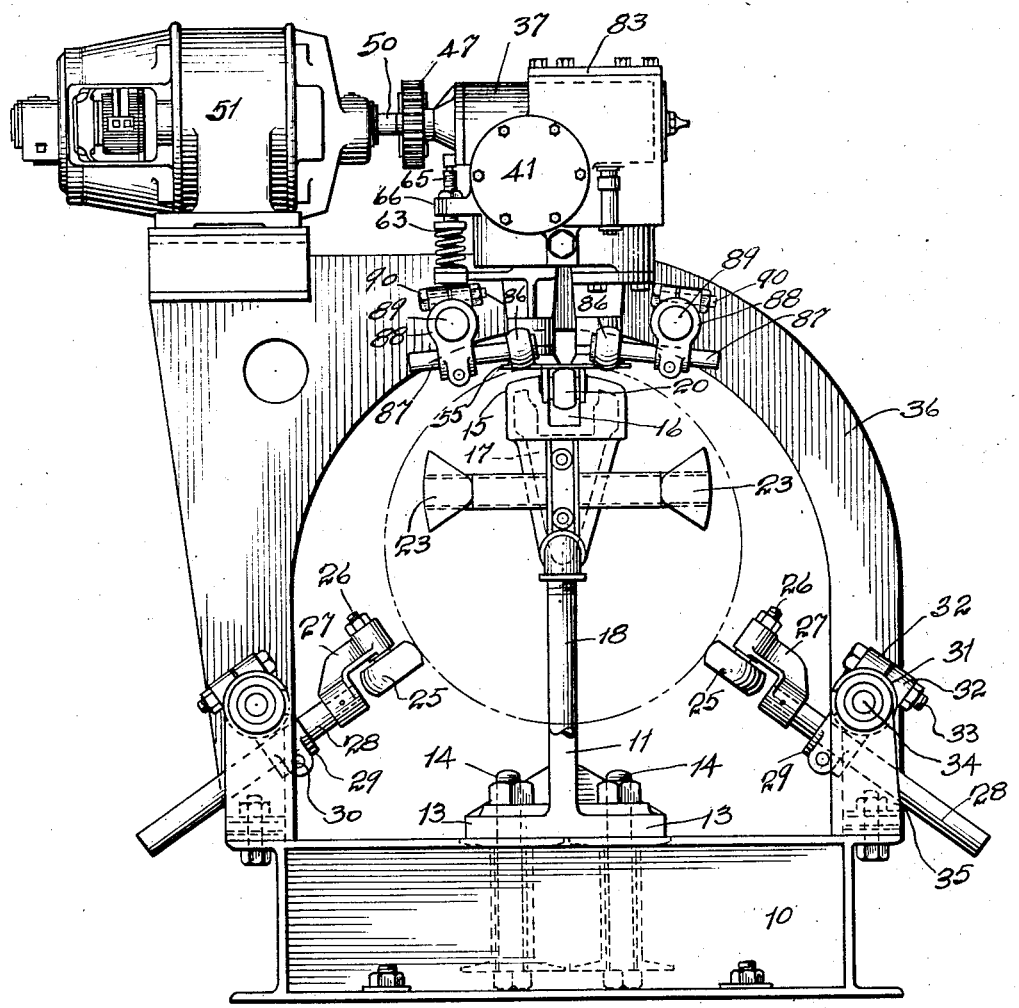
Fig. 3 is a rear end view of the machine.
Figure 4:
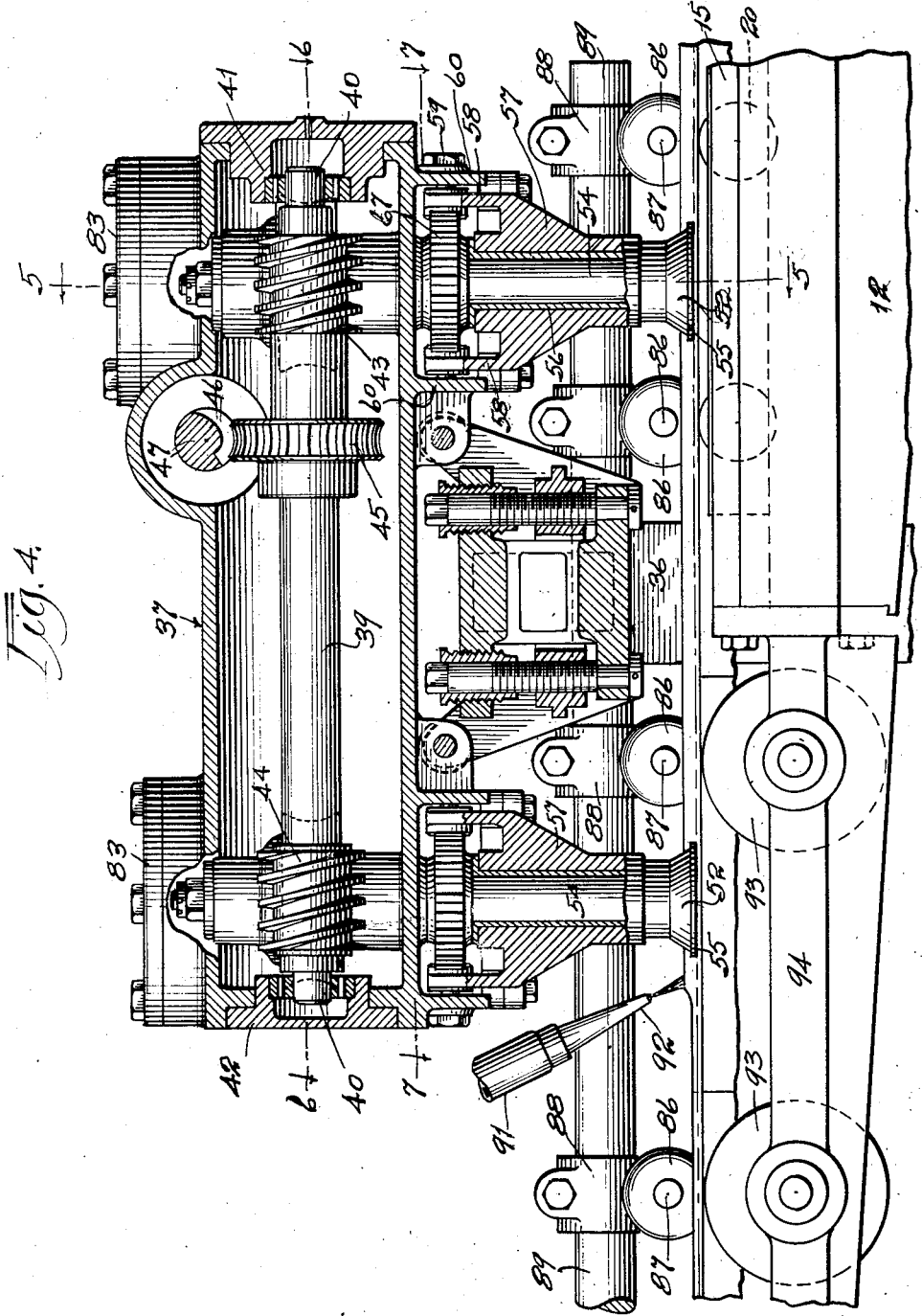
Fig. 4 is a longitudinal sectional detail showing the mountings for the feed rolls, and the power transmission mechanism for driving the same.

The bottom of the drum thus positioned is supported upon two groups of supporting rollers 25, each group consisting of a series of aligned rollers which present their edges upwardly in oblique relation and on opposite sides of the medial plane of the drum, so that the latter will be adequately supported from below during its progress through the machine. Fig. 3 shows the position of the drum in dotted lines, and indicates the manner in which it is supported upon the rollers 25.

Each of the rollers is journalled upon a pintle 26 carried by a bracket 27 having a stem 28 slidably mounted through a split collar 29, adapted to be compressed by a screw 30 to closely clamp the stem 28 when adjusted to the proper position. Each of the collars 29 is formed as an extension from a bracket 31, likewise in the form of a split collar, having flanges 32 adapted to be drawn together by a clamping bolt 33 which serves to clamp the bracket in adjusted position upon a longitudinally extending rod 34. Two of such rods are provided, one on each side of the machine. The ends of the respective rods are supported by standards 35—35, the arrangement being such that the brackets 31 may be properly positioned upon the respective rods 34 and clamped thereon, after which the rollers 25 may be adjusted in and out to conform to the diameter of the drums to be welded and to bring the rollers, when adjusted, into alignment on opposite sides of the medial plane of the drum and below the center thereof.

The stake extends forwardly through an arch 36 of sufficient spread to permit drums of the largest diameter to pass thereunder, and the arch serves as a support for the feeding rolls and power mechanism associated therewith. These mechanisms are carried by a housing 37 comprising a body 38 of generally cylindrical formation, within which is located a longitudinally extending worm shaft 39 having its ends 40 reduced and journalled within cap plates 41 and 42 respectively.

At the ends of the worm shaft are located worms 43 and 44, and between the worms is located a worm gear 45 which meshes with a worm 46 on a transversely extending transmission shaft 47, which carries, externally of the housing, a spur gear 48 meshing with a driving spur gear 49 mounted on a power shaft 50 driven by a motor 51, which is also supported upon the arch 36. The worms 43 and 44 are arranged to drive forward and rear pairs of feeding rolls 52, which are of identical construction and driven in the same manner, so that a description of one pair with its driving mechanism will suffice for both.

Figure 5:
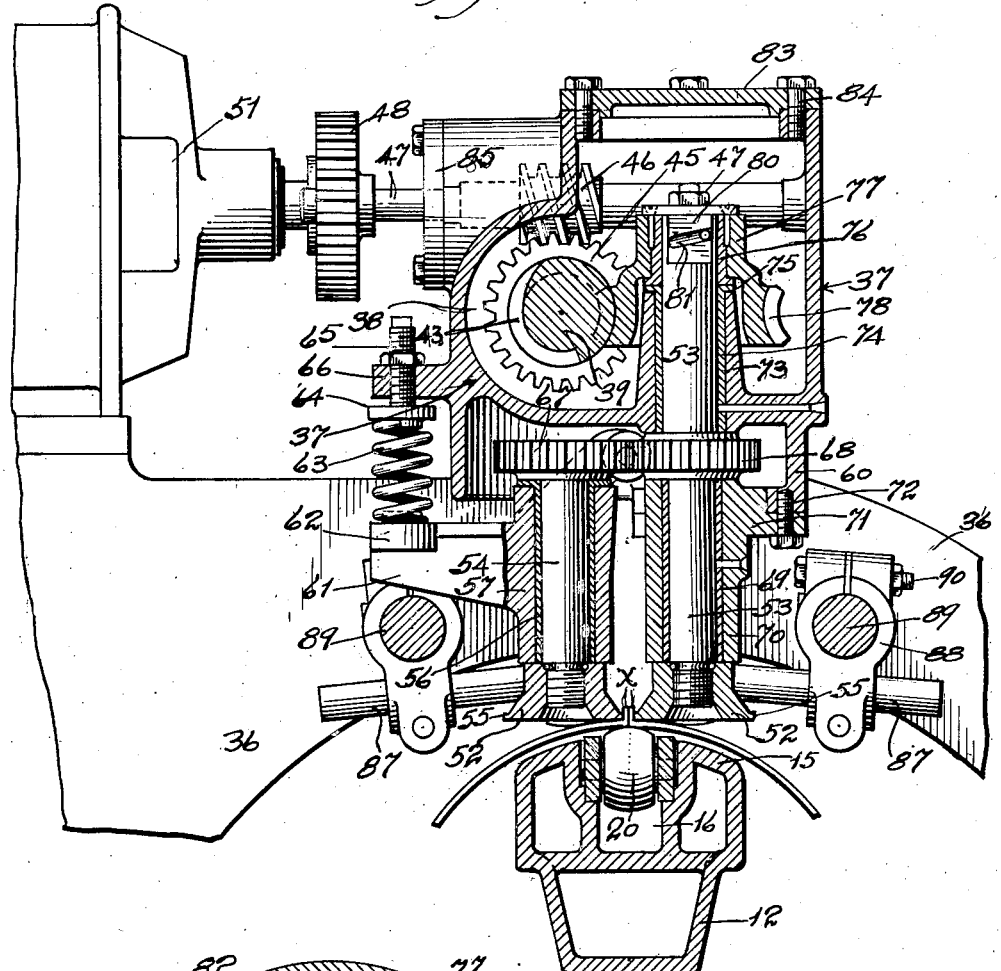
Fig. 5 is a cross sectional elevation taken on line 5—5 of Fig. 4.

The rolls 52 comprising a single pair are carried respectively upon a vertical driving shaft 53 and a vertical driven stub shaft 54 suitably spaced to position the peripheries of the rolls on opposite sides of the seam line, as shown in Fig. 5. Each of the rolls 52 is of substantially truncate conical formation having a relatively narrow biting edge 55. The biting edges of companion rolls bear against opposite sides of flanges X formed along the meeting edges of the drum, and in order to impart spring pressure to the roller contact, the roller mounted upon the stud shaft 54 is spring pressed toward its companion.

The stub shaft 54 is journalled through a bushing 56 extending vertically through a swinging bracket 57 having upwardly extending ears 58—58 which are pivotally mounted upon trunnions 59—59 entered through a wall flange 60 depending from the housing 37 near the end thereof, it being understood that the arrangement is duplicated at each end of the housing.

The bracket 57 has laterally projecting therefrom an arm 61 provided with a spring seat 62 which receives the lower end of a coil spring 63, the upper of which is contacted by a disk 64 at the lower end of an adjusting screw 65 entered through a lug 66 outstanding from the housing, so that by adjusting the screw the spring pressure can be increased or diminished. The spring tends to force the bracket with the roller carried thereby inwardly toward the companion roller which is carried by the shaft 53, which being unyieldingly mounted serves to resist the thrust of its companion spring pressed roller and to hold the flanges of the drum tightly compressed between the rollers.

The stub shaft 54 at its upper end carries a spur gear 67 which meshes with a spur gear 68 centrally mounted upon the shaft 53. The lower section of the shaft 53 below the spur gear 68 is journalled through a bushing 69 entered through a sleeve 70, which depends from a half circular plate 71 which is secured by bolts 72 to the wall flange 60.

The upper section of the shaft 53 is journalled within a bushing 73 entered through a boss 74 upstanding from the floor of the housing 37. The bushing terminates at its upper end in a marginal flange 75 which overlies the upper end of the boss, and the upper end of the shaft extends above said flange, as shown in Fig. 5. The upper end of the shaft 53 carries a collar 76 which is rotatable upon the shaft, and said collar in turn is keyed within the hub 77 of a worm gear 78, which meshes with the worm 43 (or 44).

Figure 8:
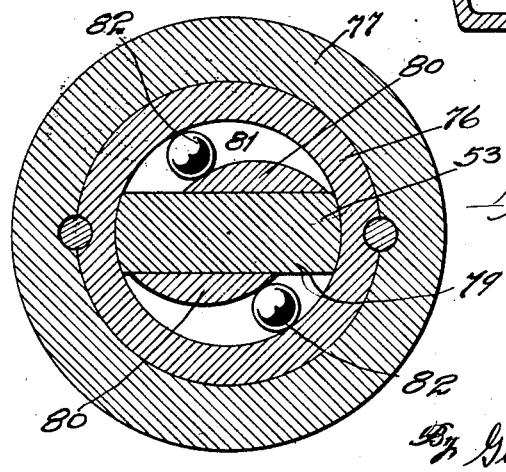
Fig. 8 is an enlarged sectional detail showing the ratchet mechanism for permitting the feed rolls to be rotated ahead of the feeding speed imparted to the rolls by the power transmission mechanism.
Figure 6:
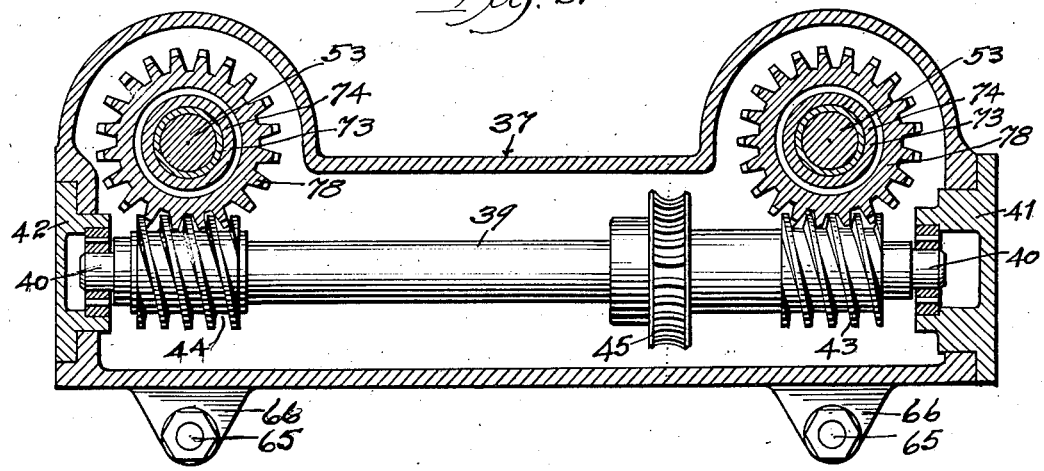
Fig. 6 is a sectional plan view taken on line 6—6 of Fig. 4.
Figure 7:
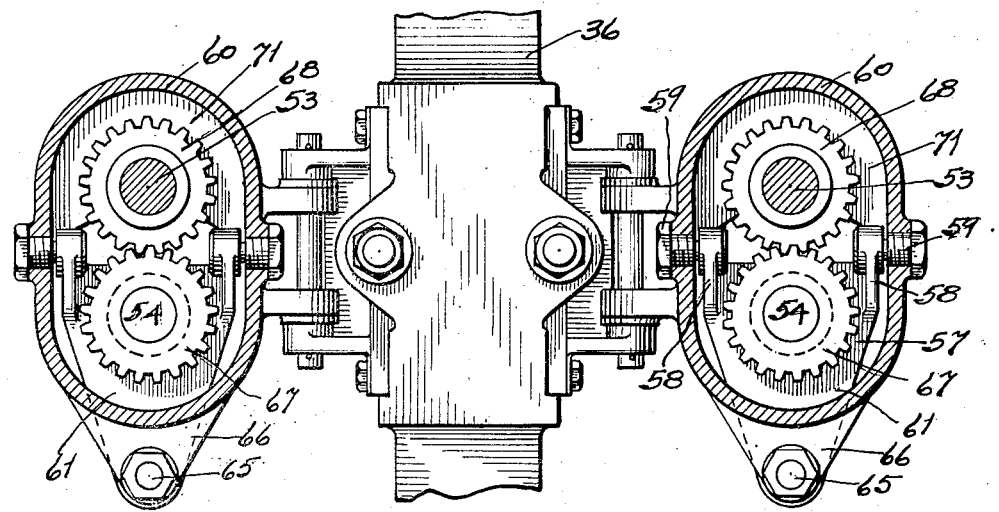
Fig. 7 is a sectional plan view taken on line 7—7 of Fig. 4.

The upper end of the shaft 53, within the collar 76, is shouldered and flattened on its sides 79 (see Fig. 8), and within the confines of the space thus afforded within the collar 72 are located blocks 80 provided with grooves 81 which are so cut with respect to the curvature of the surrounding collar as to afford converging channels within which are located balls 82 which are adapted to roll, to a limited degree, within the channels thus afforded, but which serve to wedge within the converging grooves when power is imparted to the worm gear 78 and thus constitute a ratchet clutch for transmitting power to the shaft 53.

When, however, it is desired to impart to the advancing drum a speed in excess of the normal feeding speed, in order to close up a gap between drums, the shaft 53 will be given an excess rotation as compared with the rotation of the collar 76 which is keyed to the worm gear, and this excess rotation, imparted to the shaft 53, will be permitted by the unclutching of the ball ratchet and the recession of the balls to the enlarged ends of their respective channels.

In order to afford access to the driving mechanism heretofore described, the housing 37, at points above the respective shafts 53, is provided with cap plates 83 which are secured to the housing by bolts 84, or in any other suitable manner. Similarly, the transmission shaft 47 is entered through a cap plate 85, the removal of which affords access to the interior.

In order to more firmly hold the edges of the drum in position during the feeding operation along lines adjacent to the seam, groups of pressure rollers 86 are provided along opposite sides of the seam. Each of the rollers 86 is journalled upon a spindle 87 carried by a bracket 88, the groups of brackets being respectively mounted upon rods 89 extending longitudinally of the machine near the forward end thereof and centrally supported by the arch 36 through which the rods are entered. The brackets 88 are in the form of split collars, which are adapted to be clamped in adjusted position upon the rods by the action of clamping screws 90.

In advance of the housing 37 is located a welding torch 91 provided with a nozzle 92 suitably directed to project the welding flame upon the flanged edges of the drum at a point immediately in advance of the forward set of feeding rolls 52, and in order to adequately support the drum from within during the welding operation, a plurality of rollers 93 are provided, which are journalled within an extension 94 which constitutes the forward end of the stake or beam 12. These rollers directly underlie the joint at points behind and in front of the point of application of the welding flame, so that the drums will be adequately supported, without, however, locating the rollers sufficiently near to the flame itself to heat the rollers to an objectionable degree.

*Operation*

In operation, the drum bodies to be welded are positioned on the machine with their free edges downwardly and straddling the web plate which supports the stake. As each drum body is moved forward to clear the web, it comes to a position which permits it to be rotated through 180° to bring the flanged edges upwardly with the seam or joint occupying the medial position and with the flanged edges in abutment with opposite sides of the fin or blade 24.

The drum body is exteriorly supported from below by the rollers 25 and is interiorly supported beneath the seam by the rollers 20. In this position it is advanced until it encounters the two lines of rollers 86 which bear upon the exterior of the drum body on either side of the joint. Thus positioned and with the joint properly aligned by contact with the fin or blade 24, the drum body is shoved forward by hand until the upstanding flanges are brought into the bite of the rear set of feeding rolls 52, which grip the flanges and advance the drum body under power at a predetermined rate of speed. As the drum body advances, the flanges will ultimately be brought into the bite of the forward feeding rolls, and thereafter the upstanding flanges will encounter the welding flame, which fuses the metal and welds the joint together. The flanges afford an adequate supply of metal for fusing and welding purposes, and as the fusing progresses the flanges will be melted down to substantially the level of the marginal portions of the drum body, so that the flanging of the edges not only affords a protuberance adapted to facilitate positive feeding of the drum bodies, but also affords the required supply of metal for welding purposes.

As the first drum body advances beyond the bite of the rear set of feeding rolls, the next succeeding drum body can be pushed forwardly, if necessary, to a sufficient degree to close the gap between the two drum bodies, the feeding rolls being mounted to ratchet ahead of their normal feeding speed to permit this closing up operation.

With the drum bodies in closed procession, as the rear end of the first drum body passes the welding point, the forward end of the following drum body will immediately encounter the welding flame, so that no opportunity will be afforded for the flame to lick in under the end edges of the two drum bodies and melt out a notch at the terminus of the joint, which is likely to occur if a gap between the drum bodies is afforded.

Each pair of feeding rolls includes a spring pressed member, which arrangement, in conjunction with the anti-friction rollers 20 and 25 which support the body, affords adequate means for positively advancing the drum bodies at a predetermined rate of speed, which should be properly calculated with reference to the welding speed of the torch.

The mounting for the spring pressed roller members brings the pivotal axis of each bracket 57 into alignment with the diameter of the spur gear 67 at the upper end of the shaft 54, so that the required degree of tilting is afforded without interfering with the meshing of the gears 67 and 68 which constitute the driving train for the rollers. By this arrangement, both of the feeding rolls of a pair can be driven from the shaft 53, and by providing a ratchet clutch for this shaft, the ratcheting of both of the feed rolls of a pair is provided for.

The roller mountings provided for supporting the drum bodies permit of both horizontal and radial adjustments within the range required to accommodate the machine to drum bodies of varying diameters, and the roller mountings are of a character which permit the number of rollers to be increased or diminished, as occasion may require, to support drum bodies of varying size and weight.

The invention as a whole is one which permits a procession of drum bodies to be accurately and uniformly welded without waste of material, and at a sufficiently uniform rate of speed to conserve the gases supplied to the welding flame, since a continuous procession of drum bodies can be advanced, in closed ranks, under the welding flame, and at a feeding speed which will be accurately computed in ratio to the fusing speed at the welding point, so that at no time will any area of the metal be subjected for an unduly protracted period to the influence of the welding flame. By proper manipulation and adjustment, the speed of advance can be uniformly maintained, with the result that a perfect welding operation will be attained.

The machine as a whole is of simple and rugged construction and so arranged as to permit the operator to stand in close proximity to the advancing procession of drum bodies and in position to perform the necessary manipulations in Although the invention has been described with considerable particularity as to detail, it is not the intention to limit the claims to the precise mechanism shown and described, since variations therein may be introduced without departing from the spirit of the invention.

I claim:

1. In a welding machine adapted to weld drum bodies having flanged edges, the combination of a base, a relatively narrow support upstanding from the base and which the unwelded drums straddle in passing to welding position, a forwardly extending stake carried by said support and having its forward end unsupported, feeding rolls associated with the stake and positioned to stand exteriorly of the drum bodies and engaging the flanged edges thereof, and a torch in advance of the feeding rolls and adapted to apply a welding flame against the flanges contiguous to the joint to weld the same.

2. In a welding machine adapted to weld drum bodies having flanged edges, the combination of a base, a relatively narrow support upstanding from the base, a forwardly extending stake carried by said support and having its forward end unsupported, feeding rolls associated with the stake and positioned to stand exteriorly of the drum bodies and engaging the flanged edges thereof, and a torch in advance of the feeding rolls and adapted to apply a welding flame against the flanges contiguous to the joint to weld the same, power transmission means for driving the feeding rolls, and ratchet means within said line of transmission to permit the rolls to be ratcheted ahead of their normal feeding speed.

3. In a welding machine adapted to weld drum bodies having flanged edges, the combination of a base, a web plate upstanding from the base and adapted to be straddled by the unwelded drums as they pass into welding position on the stake, a stake rearwardly supported upon said web plate and having its forward end unsupported, forward and rear pairs of feeding rolls adapted to engage the drum body flanges contiguous to the joint, one roll of each pair being spring pressed toward the other, a driving train for each pair of rolls, and a welding torch in advance of the forward set of feeding rolls.

4. In a welding machine adapted to weld drum bodies having flanged edges, the combination of a base, a web plate upstanding from the base, a stake rearwardly supported upon said web plate and having its forward end unsupported, forward and rear pairs of feeding rolls adapted to engage the drum body flanges contiguous to the joint, one roll of each pair being spring pressed toward the other, a driving train for each pair of rolls, the driving train for the rear pair of feed rolls including ratchet elements adapted to permit said pair of feed rolls to ratchet ahead of their feeding speed, and a welding torch in advance of the forward set of feeding rolls.

5. In a welding machine adapted to weld drum bodies having flanges along their edges, the combination of a base, a web plate upstanding from the base and adapted to be straddled by the unwelded drums passed into position on the stake, a stake rearwardly supported upon said web plate and having its forward end unsupported, anti-friction rollers located below the stake for supporting the drum bodies from below, anti-friction rollers carried by the stake for interiorly supporting the drum bodies at points contiguous to the joint, and power driven feeding rolls adapted to engage the flanges along the edges of the drum bodies, and a torch in advance of said feeding rolls.

6. In a welding machine adapted to weld drum bodies having flanges along their edges, the combination of a base, a web plate upstanding from the base, a stake rearwardly supported upon said web plate and having its forward end unsupported, anti-friction rollers located below the stake for supporting the drum bodies from below, said rollers being adjustable to accommodate drum bodies of varying diameters, anti-friction rollers carried by the stake for interiorly supporting the drum bodies at points contiguous to the joint, and power driven feeding rolls adapted to engage the flanges along the edges of the drum bodies, and a torch in advance of said feeding rolls.

7. In a welding machine adapted to weld drum bodies having flanges along their edges, the combination of a base, a web plate upstanding from the base, a stake rearwardly supported upon said web plate and having its forward end unsupported, anti-friction rollers located below the stake for supporting the drum bodies from below, anti-friction rollers carried by the stake for interiorly supporting the drum bodies at points contiguous to the joint, and power driven feeding rolls adapted to engage the flanges along the edges of the drum bodies, and a torch in advance of said feeding rolls, one member of a pair of feeding rolls being spring pressed toward the other.

8. In a welding machine adapted to weld drum bodies having flanges along their edges, the combination of a base, a web plate upstanding from the base, a stake rearwardly supported upon said web plate and having its forward end unsupported, anti-friction rollers located below the stake for supporting the drum bodies from below, said rollers being adjustable to accommodate drum bodies of varying diameters, anti-friction rollers carried by the stake for interiorly supporting the drum bodies at points contiguous to the joint, and power driven feeding rolls adapted to engage the flanges along the edges of the drum bodies, and a torch in advance of said feeding rolls, one member of a pair of feeding rolls being spring pressed toward the other.

9. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of a pair of feeding rolls, transmission elements entrained with the respective roll shafts, a motor carried by the arch and having a driving connection with said transmission train, and a welding torch carried by the housing in advance of the forward pair of feeding rolls.

10. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of each pair of feeding rolls, transmission elements entrained with the respective roll shafts, the roll shaft of the rear pair of feed rolls being entrained with the driving train through a ratchet clutch adapted to permit the rear pair of feeding rolls to be ratcheted ahead of their normal feeding speed, a motor carried by the arch and having a driving connection with said transmission train, and a welding torch carried by the housing in advance of the forward pair of feeding rolls.

11. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of each pair of feeding rolls, transmission elements entrained with the respective roll shafts, a motor carried by the arch and having a driving connection with said transmission train, and a welding torch carried by the housing in advance of the forward pair of feeding rolls, two sets of anti-friction rollers located below the stake and on opposite sides of its medial plane and adapted to support the drum bodies exteriorly from below, and anti-friction rollers carried by the stake and positioned to support the drum bodies from within along a line contiguous to the joint.

12. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of each pair of feeding rolls, transmission elements entrained with the respective roll shafts, the roll shaft of the rear pair of feeding rolls being entrained with the driving train through a ratchet clutch adapted to permit the rear pair of feeding rolls to be ratcheted ahead of their normal feeding speed, a motor carried by the arch and having a driving connection with said transmission train and a welding torch carried by the housing in advance of the forward pair of feeding rolls, two sets of anti-friction rollers located below the stake and on opposite sides of its medial plane and adapted to support the drum bodies exteriorly from below, and anti-friction rollers carried by the stake and positioned to support the drum bodies from within along a line contiguous to the joint.

13. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of a pair of feeding rolls, transmission elements entrained with the respective roll shafts, a motor carried by the arch and having a driving connection with said transmission train, and a welding torch carried by the housing in advance of the forward pair of feeding rolls, two sets of anti-friction rollers located below the stake and adapted to exteriorly support the drum bodies along lines on opposite sides of the medial plane of the stake, each of said rollers being carried by a stem, a mounting for each of said stems, adapted to permit in and out adjustment thereof to accommodate drum bodies of varying diameter, and supports for each set of mountings.

14. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of a pair of feeding rolls, transmission elements entrained with the respective roll shafts, the roll shaft of the rear pair of feed rolls being entrained with the driving train through a ratchet clutch adapted to permit the rear pair of feeding rolls to be ratcheted ahead of their normal feeding speed, a motor carried by the arch and having a driving connection with said transmission train, and a welding torch carried by the housing in advance of the forward pair of feeding rolls, two sets of anti-friction rollers located below the stake and adapted to exteriorly support the drum bodies along lines on opposite sides of the medial plane of the stake, each of said rollers being carried by a stem, a mounting for each of said stems, adapted to permit in and out adjustment thereof to accommodate drum bodies of varying diameter, and supports for each set of mountings.

15. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of a pair of feeding rolls, transmission elements entrained with the respective roll shafts, a motor carried by the arch and having a driving connection with said transmission train, and a welding torch carried by the housing in advance of the forward pair of feeding rolls, two sets of anti-friction rollers located below the stake and adapted to exteriorly support the drum bodies along lines on opposite sides of the medial plane of the stake, each of said rollers being carried by a stem, a mounting for each of said stems, adapted to permit in and out adjustment thereof to accommodate drum bodies of varying diameter, and supports for each set of mountings, said supports being angularly adjustable to vary the angles of the roller stems.

16. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of a pair of feeding rolls, transmission elements entrained with the respective roll shafts, the roll shaft of the rear pair of feed rolls being entrained with the driving train through a ratchet clutch adapted to permit the rear pair of feeding rolls to be ratcheted ahead of their normal feeding speed, a motor carried by the arch and having a driving connection with said transmission train, and a welding torch carried by the housing in advance of the forward pair of feeding rolls, two sets of anti-friction rollers located below the stake and adapted to exteriorly support the drum bodies along lines on opposite sides of the medial plane of the stake, each of said rollers being carried by a stem, a mounting for each of said stems, adapted to permit in and out adjustment thereof to accommodate drum bodies of varying diameter, and supports for each set of mountings, said supports being angularly adjustable to vary the angles of the roller stems.

17. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of a pair of feeding rolls, transmission elements entrained with the respective roll shafts, a motor carried by the arch and having a driving connection with said transmission train, and a welding torch carried by the housing in advance of the forward pair of feeding rolls, two sets of anti-friction rollers located below the stake and adapted to exteriorly support the drum bodies along lines on opposite sides of the medial plane of the stake, each of said rollers being carried by a stem, a mounting for each of said stems, adapted to permit in and out adjustment thereof to accommodate drum bodies of varying diameter, and supports for each set of mountings, said supports being angularly adjustable to vary the angles of the roller stems, and a set of anti-friction rollers carried by the stake and adapted to bear against the interior of the drum bodies along lines contiguous to the joints to be formed therein.

18. In a welding machine adapted to weld drum bodies having flanges along their edges, the combination of a base, a web plate upstanding from the base, a stake rearwardly supported upon the web plate and unsupported at its forward end, an arch through which the stake extends, a housing carried by the arch, forward and rear pairs of feeding rolls, one roll of each pair being mounted upon a shaft journalled through the housing, and the other roll of each pair being mounted upon a stub shaft journalled within a swinging bracket carried by the housing, springs bearing respectively against each of said brackets for urging the roll carried thereby toward its companion roll, entrained gear members carried respectively by the shaft and stub shaft of a pair of feeding rolls, transmission elements entrained with the respective roll shafts, the roll shaft of the rear pair of feed rolls being entrained with the driving train through a ratchet clutch adapted to permit the rear pair of feeding rolls to be ratcheted ahead of their normal feeding speed, a motor carried by the arch and having a driving connection with said transmission train, and a welding torch carried by the housing in advance of the forward pair of feeding rolls, two sets of anti-friction rollers located below the stake and adapted to exteriorly support the drum bodies along lines on opposite sides of the medial plane of the stake, each of said rollers being carried by a stem, a mounting for each of said stems, adapted to permit in and out adjustment thereof to accommodate drum bodies of varying diameter, and supports for each set of mountings, said supports being angularly adjustable to vary the angles of the roller stems, and a set of antifriction rollers carried by the stake and adapted to bear against the interiors of the drum bodies along lines contiguous to the joints to be formed therein.

19. In a machine for welding drum bodies, the combination of a base, a stake mounting carried by the base, a stake supported by the mounting and standing in elevated relation with respect to the base and having its forward end unsupported, the stake mounting being configured to permit the drum bodies to be positioned upon the stake in inverted relation and with their free edges distended to clear the support and to be thereafter inverted to bring their free edges upward, two sets of aligned supporting rollers located below the stake and positioned to bear against the exteriors of the drum bodies on opposite sides of the medial plane of the stake, and a welding torch located near the forward end of the stake in position to project a welding flame along the line of the joint.

20. In a machine for welding drum bodies, the combination of a base, a stake mounting carried by the base, a stake supported by the mounting and standing in elevated relation with respect to the base and having its forward end unsupported, the stake mounting being configured to permit the drum bodies to be positioned upon the stake in inverted relation and with their free edges distended to clear the support, and to be thereafter inverted to bring their free edges upwardly, two sets of aligned supporting rollers located below the stake and positioned to bear against the exteriors of the drum bodies on opposite sides of the medial plane of the stake, anti-friction rollers carried by the stake and positioned to bear against the interiors of the drum bodies along a line contiguous to the joint to be formed therein, a thin blade carried by the stake and positioned to stand in interposed relation between the edges of the drum bodies to align the same, and a welding torch located near the forward end of the stake in position to project a welding flame along the line of the joint.

21. In a machine for welding individual drums in successive order, the combination of a stake along which the drums are passed in one direction—one succeeding the other, welding means positioned to weld the drum seams as the drums pass said welding means, feeding mechanism for engaging and moving the drums along said stake in relation to the welding means, said feeding mechanism including rolls and power means for driving said rolls at a given feeding speed, and means associated with said rolls permitting the advance of a succeeding drum along the stake at a speed in excess of said feeding speed to bring the succeeding drum into abutting engagement with a preceding drum prior to its reaching the welding position.

22. In a machine for welding individual drums in successive order, the combination of a stake upon which the unwelded drums are fed at one end and from which the welded drums are discharged at the opposite end, a seam-welding device above said stake in position to weld the drum seams as the drums pass along the stake, a stake support beneath the stake which the unwelded drums are adapted to straddle as said unwelded drums are being placed onto the stake, means permitting the unwelded drums to be rotated on the stake to bring their seams into alignment with the seam of the drum being welded, feeding mechanism engaging the drums for moving the drums past the welding device at a given speed, and means associated with said feeding mechanism, permitting a drum to be advanced along the stake at greater speed to bring it into abutting contact with the preceding drum while said preceding drum is being welded.

23. In a welding machine for welding the longitudinal seams of individual drums having flanged edges at their seams, the combination of a base, a forwardly extending stake adapted to receive unwelded drums at one end and from which the welded drums are discharged at the opposite end, a relatively narrow support for said stake upstanding from the base and adapted to be straddled by the unwelded drums with their seams distended and on their under side as the drums are placed onto the stake, a relatively stationary welding device above the stake, feeding rolls associated with the stake and positioned to stand exteriorly of the drums and engage the flanged edges thereof, and means intermediate said stake support and said feeding rolls permitting the rotation of each succeeding drum on the stake to bring its seam into alignment with the drum being welded.

24. In a welding machine for welding the longitudinal seams of individual drums having flanged edges at their seams, the combination of a base, a forwardly extending stake adapted to receive unwelded drums at one end and from which the welded drums are discharged at the opposite end, a relatively narrow support for said stake upstanding from the base and adapted to be straddled by the unwelded drums with their seams distended and on their under side as the drums are placed onto the stake, a relatively stationary welding device above the stake, feeding rolls associated with the stake and positioned to stand exteriorly of the drums and engage the flanged edges thereof, means intermediate said stake support and said feeding rolls permitting the rotation of each succeeding drum on the stake to bring its seam into alignment with the drum being welded, and means permitting the feed rolls to ratchet ahead of their feeding speed to enable each succeeding drum to be moved manually at greater speed into abutting end-to-end contact with the preceding drum being welded.

25. In a machine for welding the longitudinal seams of individual drums in successive order, the combination of a relatively stationary welding device, power driven mechanism engaging the drums for feeding the drums longitudinally in welding relation to said welding device, a support for the drums along which the drums are fed in relation to said welding device, and means operable to permit the succeeding drums to be moved in relation to said feeding mechanism and at a greater speed for enabling the succeeding drums to be brought into abutting contact with the preceding drum being welded.

26. In a machine for welding the longitudinal seams of individual drums in succession, the combination of a supporting stake along which the drums are moved with their seams in welding relation to said welding device, power driven feeding mechanism engaging the drums for feeding said drums along said stake support, means acting on said drums as they move to hold the edges of the seams in welding relation, and means associated with said feeding mechanism enabling a succeeding drum to be moved in relation to said feeding mechanism at a greater speed for bringing said succeeding drum into end-to-end contact with a preceding drum being welded.

27. In a machine for welding the longitudinal seams of individual drums in succession, the combination of a relatively stationary welding device, power driven mechanism for feeding the drums successively with their seams in welding relation to said welding device, a stake member for the drums along which the drums are moved by said feeding mechanism, a support for said stake member in advance of the feeding mechanism adapted to be straddled by the drums in a distended condition to enable the drums to be placed on said stake.

28. In a machine of the class described, the combination of a substantially horizontal elongated support along which drums to be welded are placed in successive order, welding mechanism for the seams of the drums positioned above said support, including means for feeding the drums longitudinally during the welding operation, and means permitting the drums to be welded to be placed on said support with their unwelded seams on the bottom side and then rotated to bring their seams to the top side in alignment with the preceding drum being welded, said means including a standard upon which said drum support is mounted, said standard being spaced in advance of the feeding mechanism and positioned beneath the support to be straddled by the drums with their seams distended as the drums are being placed on the support.

WILLIS J. BOYLE, Jr.
LELAND S. ROSENER.